United States Patent
Blundy

(10) Patent No.: US 6,196,822 B1
(45) Date of Patent: Mar. 6, 2001

(54) CONVERSION MANIFOLD FOR MULTIPLE INJECTION UNIT INJECTION MOLDING MACHINE

(75) Inventor: John D. Blundy, Clarkston, MI (US)

(73) Assignee: Incoe Corporation, Troy, MI (US)

( * ) Notice: Subject to any disclaimer, the term of this patent is extended or adjusted under 35 U.S.C. 154(b) by 0 days.

(21) Appl. No.: 09/216,442

(22) Filed: Dec. 18, 1998

(51) Int. Cl.$^7$ ................................................. B29C 45/16
(52) U.S. Cl. ................................................. 425/130; 425/573
(58) Field of Search ................................................. 425/130, 573

(56) References Cited

U.S. PATENT DOCUMENTS

| | | |
|---|---|---|
| 4,376,625 | 3/1983 | Eckardt . |
| 4,715,802 | * 12/1987 | Arai ........................ 425/573 |
| 5,374,178 | * 12/1994 | Nakayama ................ 425/130 |
| 5,650,178 | 7/1997 | Bemis . |

\* cited by examiner

*Primary Examiner*—Tim Heitbrink

(57) ABSTRACT

A manifold for a multiple injection unit injection molding machine that allows the machine to be used when a standard conventional mold is attached to a platen. The manifold includes a first inlet port that is in communication with one nozzle of the machine and a second inlet port that is in communication with another nozzle of the machine. Each inlet port communicates with an inlet passage and the two inlet passages join an exit passageway at a junction. The exit passageway is in communication with an exit port to transfer fluid to a mold cavity. The manifold has a valve located at the junction to control the flow of material through the exit passageway.

8 Claims, 2 Drawing Sheets

CONVERSION MANIFOLD FOR MULTIPLE INJECTION UNIT INJECTION MOLDING MACHINE

TECHNICAL FIELD

The present invention relates to injection molding machines with two or more injection units. More specifically, the present invention relates to a manifold adapter for use on multi-component or multicolor injection molding machines, which allows them to function as standard single nozzle injection molding machines and to be utilized with standard molds.

BACKGROUND OF THE INVENTION

Current multi-component or multi-color molding machines used for multiple color or two shot molding inject molten material, such as plastic, utilize two or more different injection units. These special purpose injection molding machines require molds designed to accept multiple injection points which are unique to the molded part to be produced.

These multiple injection unit molding machines cannot be utilized with standard single nozzle injection molds because of their configurations. Additionally, these two-barrel or two-color injection molding machines which typically have two through holes in the stationary platen are generally under utilized, since they are limited to only molds having two sprue bushings. Standard single sprue bushing molds cannot be utilized in these special machines as they require molds that are specially designed for molding two-color, two-component parts. When the production requirement for that application is finished, these injection molding machines typically sit idle, until that requirement is again needed.

SUMMARY OF THE INVENTION

It is an object of the present invention to provide a manifold that allows special purpose injection molding machines, such as multiple color or component molding machines to utilize standard or single sprue bushing molds.

It is another object of the present invention to provide a manifold adapter that allows any standard conventional mold to operate with a two-color or two-component injection molding machine.

It is a further object of the present invention to provide a significantly less expensive alternative to purchasing both a standard single nozzle injection molding machine and a multiple color or component special purpose injection molding machine.

In accordance with the objects of the present invention, a manifold for attachment to a multiple injection unit injection molding machine to allow the machine to be used with a standard conventional mold is provided. The manifold is preferably attached to a false platen, which is then attached to the stationary platen of the multiple injection unit injection molding machine. The manifold includes a first inlet port that is in communication with one nozzle of the molding machine to receive molten material therefrom. The manifold further includes a second inlet port that is in communication with the other nozzle of the injection molding machine to receive molten material therefrom. The first inlet port is in communication with a first inlet passage and the second inlet port is in communication with a second inlet passage. The first inlet passage and the second inlet passage each have a first end that receives material from a respective nozzle and a second end opposite their first end. An exit port is also provided that is in communication with a first end of an exit passageway. A second end of the exit passageway is opposite the first end and is in communication with the second end of the first inlet passage and the second end of the second inlet passage at a juncture. A valve for controlling the flow of material through the manifold is preferably positioned at the juncture.

These and other features and advantages of the present invention will become apparent from the following description of the invention, when viewed in accordance with the accompanying drawings and appended claims.

BEST MODE(S) FOR CARRYING OUT THE INVENTION

Figure 1:
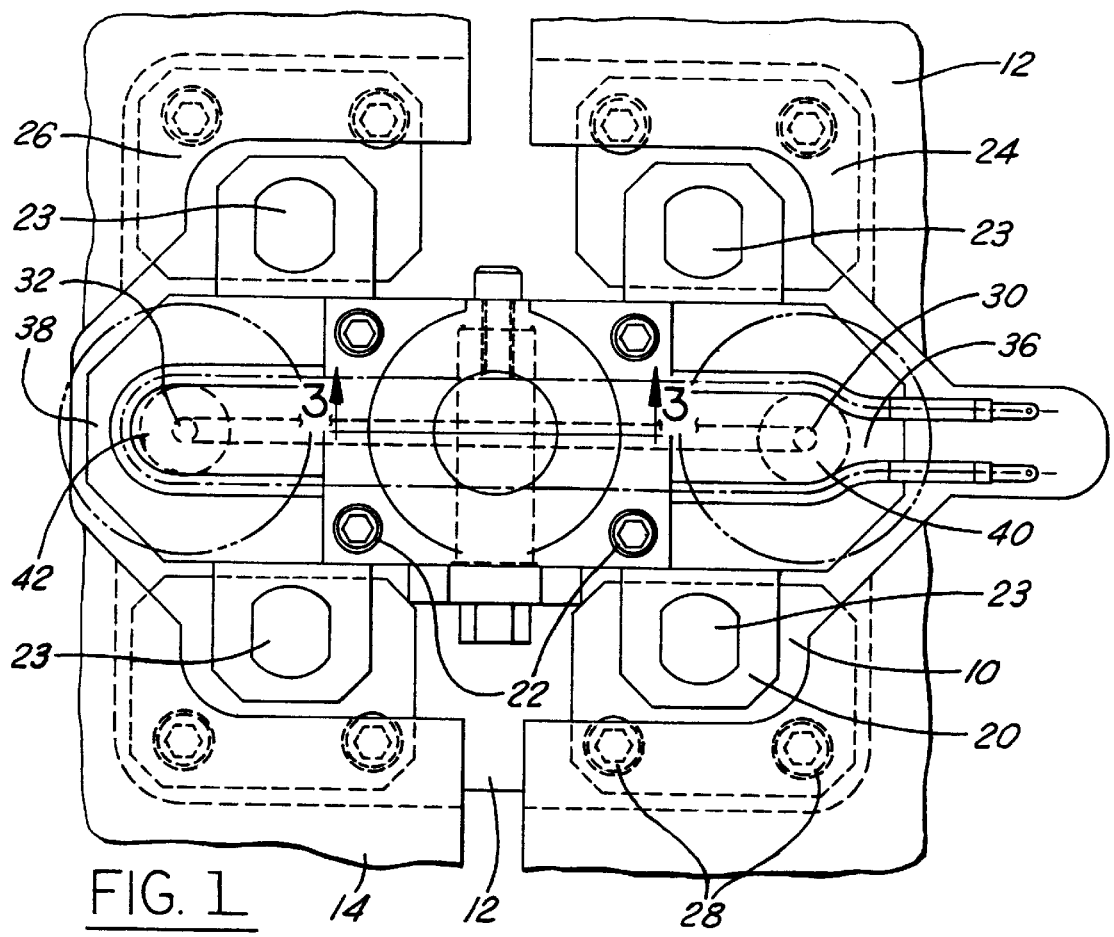
FIG. 1 is a front view of a multi-flow path injection conversion manifold in accordance with a preferred embodiment of the present invention.
Figure 2:
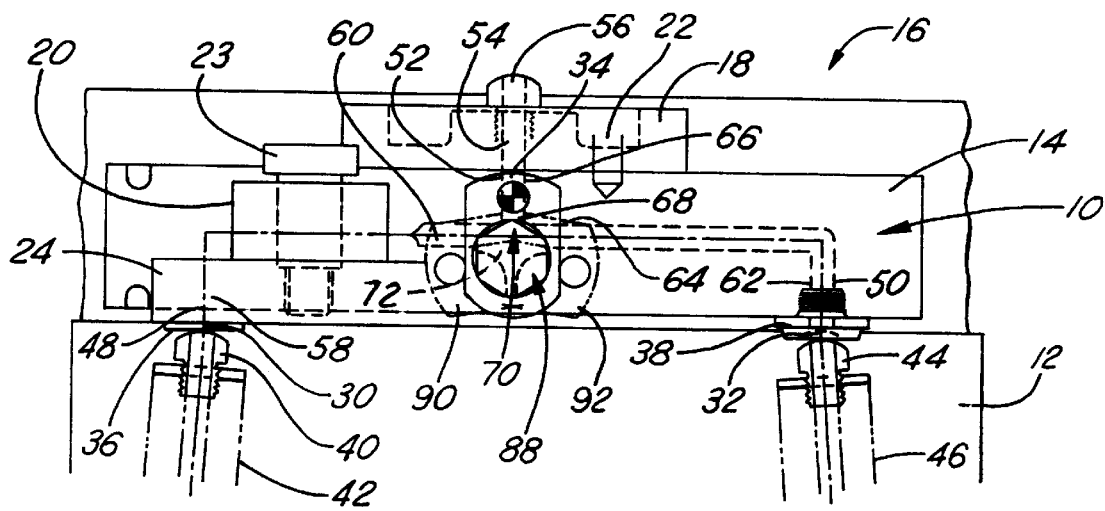
FIG. 2 is a top view partially in cross-section of a multi-flow path injection conversion manifold in accordance with a preferred embodiment of the present invention.

Referring to the figures, a manifold 10 for incorporation into a multi-color/component injection molding machine is illustrated. The manifold 10 is preferably positioned between an injection site of the multi-color/component injection molding machine and a mold, as is described in more detail below. In operation, a platen 12 and a false platen 14, which is attached to the platen 12 and surrounds the manifold 10, are moved into communication with a mold 16 upon initiation of the injection molding sequence. The operation of the platen 12 and the initiation sequence is well-known in the art.

The manifold 10 has a locator plate 18 bolted thereto by a plurality of bolts 22 or the like. A guide block 20 allows the manifold 10 to be attached directly to the platen 12 by a plurality of guide posts 23 that pass through a pair of mounting blocks 24, 26. The pair of mounting blocks 24, 26 are preferably attached directly to the platen 12 by screws 28 or the like. It should be understood that the attachment of the manifold 10 to the platen 12, may be accomplished by a variety of different ways.

The manifold 10 has a first inlet port 30, a second inlet port 32, and an exit port 34. The first inlet port 30 has a first nozzle seat 36 positioned therein while the second inlet port 32 has a second nozzle seat 38 positioned therein. The first inlet port 30 is in fluid communication with a first inlet nozzle 40 which receives a molten material, such as a molten plastic, from a first barrel 42. The second inlet port 32 is in communication with a second inlet nozzle 44 which receives a molten material, such as a molten plastic, from a second barrel 46. The molten material transferred through the first inlet port 30 is conveyed to a first inlet passage 48 within the manifold 10. The molten material transferred through the second inlet port 32 is in fluid communication with a second inlet passage 50 within the manifold 10. The exit port 34 is in fluid communication with an exit passageway 52. The manifold of the present invention may be utilized in connection with any molten material, including foam and plastic.

The exit passageway 52 is in communication with a conduit 54 formed in the locator block 18. The conduit 54 is in fluid communication with an exit nozzle 56, which communicates with the mold 16 to inject material into the cavity formed in the mold 16. The first inlet passage 48 has a first end 58 in communication with the first nozzle seat 36 and a second end 60 opposite the first end 62. The second inlet passage 50 has a first end 62 in communication with the second nozzle seat 38 and a second end 64 opposite the first end 62. The exit passageway 52 has a first end 66 in communication with the conduit 54 and a second end 68 opposite the first end 66. The second end 68 of the exit passageway 52 preferably meets with the second end 60 of the first inlet passage 48 and the second end 64 of the second inlet passage 50 at a junction 70.

Figure 4:
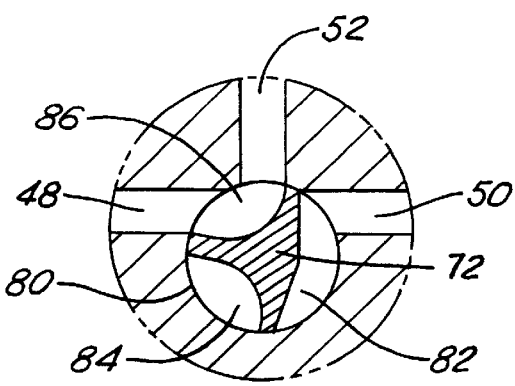
FIG. 4 is a schematic illustration of a fluid flow adjusting pin in a position allowing flow from one injection barrel into a mold cavity in accordance with a preferred embodiment of the present invention.
Figure 5:
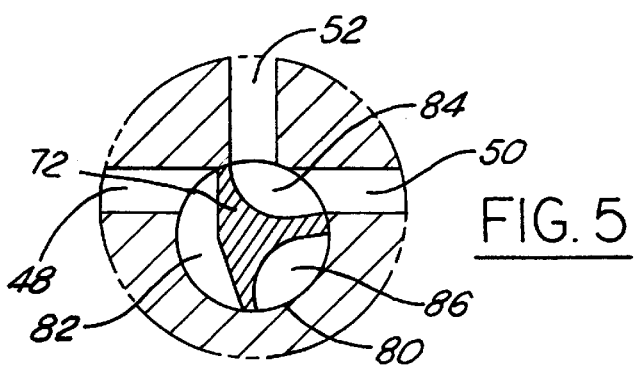
FIG. 5 is a schematic illustration of a fluid flow adjusting pin in a position allowing flow from the other injection barrel into a mold cavity in accordance with a preferred embodiment of the present invention.
Figure 6:
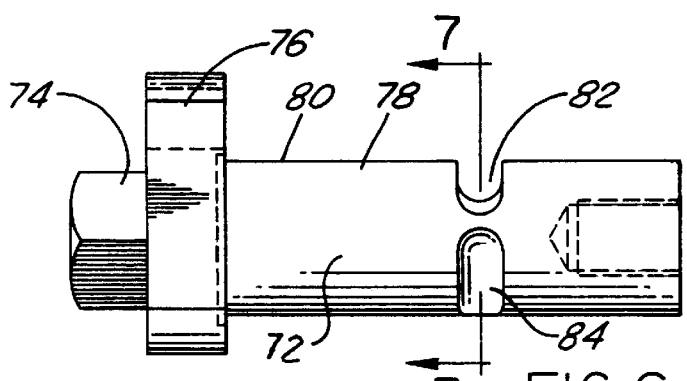
FIG. 6 is a side view of a fluid flow adjusting pin oriented to allow flow into a mold cavity as illustrated in FIG. 3.

A flow adjusting pin 72 is preferably positioned within the manifold 10 such that it is in communication with the junction 70. The flow adjusting pin 72 is rotatable about its center axis so that it has three separate positions to regulate fluid flow. These positions are shown in FIGS. 3, 4, and 5.

Figure 3:
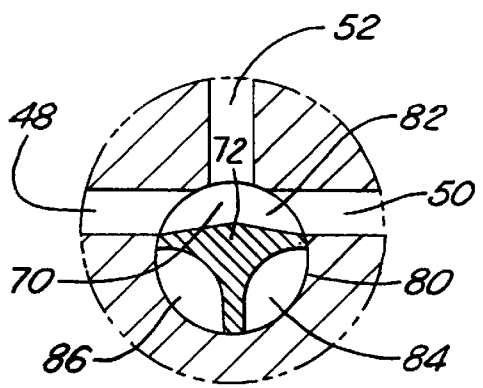
FIG. 3 is schematic illustration of a flow adjusting pin in a position allowing fluid flow from both injection barrels into a mold cavity in accordance with a preferred embodiment of the present invention.

FIG. 3 illustrates the flow adjusting pin 72 in a first position. In the first position 88, the pin 72 allows molten material to flow from both the first inlet passage 48 and the second inlet passage 50 through the exit passageway 52 and to the exit port 34. As shown in FIG. 4, when the flow adjusting pin 72 is turned to a second position 90, the flow of molten material from the first inlet passage 48 is allowed to flow through the exit passageway 52 while the flow of molten material from the second inlet passage 50 is prevented from flowing to the exit passageway 52. FIG. 5 illustrates the flow adjusting pin 72 in a third position 92 wherein the flow of molten material from the second inlet passage 50 is allowed to flow directly to the exit passageway 52 while the flow of molten material from the first inlet passage 48 is prevented from flowing to the exit passage 52.

Referring now specifically to the flow adjusting pin 72 in accordance with a preferred embodiment of the present invention. The flow adjusting pin 72 has a rotatable knob portion 74, a flange portion 76 fixed to the knob portion 74, and a stem portion 78. The pin 72 is preferably placed into a bore formed in the manifold 10 so that the stem portion 78 communicates with the junction 70. The bore is formed of such a diameter that the periphery 80 of the stem portion 78 fits snugly therein. Once the pin 72 is positioned within the bore, the knob portion 74 extends from the manifold 10 such that an operator can rotate with the aid of a standard tool or wrench the pin 72 to the appropriate position. The flange portion 76 rotates with the knob portion 74 and provides a visual indication of what position the flow adjusting pin 72 is in. The stem portion 78 preferably has three channels 82, 84, and 86 formed therein for communication with the passages 48, 50, and 52 at the junction 70.

Figure 7:
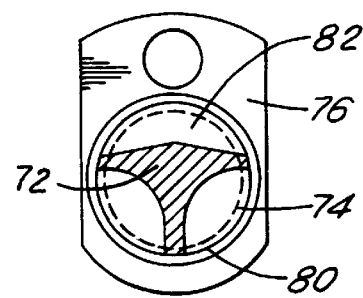
FIG. 7 is an end view of the flow adjusting pin as oriented in FIG. 6.
Figure 8:
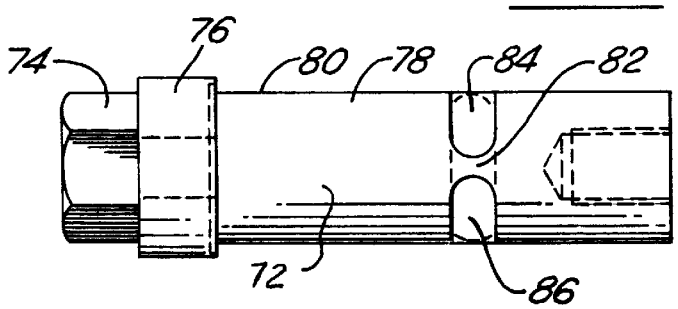
FIG. 8 is a side view of a flow adjusting pin oriented to allow flow into a mold cavity as illustrated in FIG. 5.

In operation, when the pin 72 is in its first position 88, which is schematically illustrated in FIG. 3, molten material from both the first inlet passage 48 and the second inlet passage 50 is allowed to flow through the junction 70 and to the exit passageway 52 for use in molding a part. The position of the knob portion 74 and the flange portion 76 when the pin 72 is in its first position, is illustrated in FIG. 7. In the first position 88, molten material contacts the first channel 82 that extends across the entire junction 70 and thus can flow unimpeded to the exit passageway 52.

When the pin 72 is in its second position 90, which is schematically illustrated in FIG. 4, the third channel 86 allows molten material from the first inlet passage 48 to flow directly to the exit passageway 52. In this position, the flow of material from the second inlet passage 50 is prevented from entering the junction 70, and is instead contacts the periphery 80 of the stem portion 78 halting its flow. When the pin 72 is in its third position 92, which is schematically illustrated in FIG. 5, the second channel 84 allows the molten material from the second inlet passage 50 to flow directly to the exit passageway 52. In this position, the flow of material from the first inlet passage 48 is prevented from entering the junction 70, and instead contacts the periphery 80 of the stem portion 78 halting its flow.

Having now fully described the invention, it will be apparent to one of ordinary skill in the art that many changes and modifications can be made thereto without departing from the spirit or scope of the invention as set forth herein.

What is claimed is:

1. An injection molding apparatus comprising:

a platen;

a mold which is fixed to said platen, defining a mold cavity, said mold cavity having an inlet;

a false platen mounted to said platen;

a manifold mounted on said false platen, said manifold having an exit nozzle and a pair of inlet nozzles;

a first injection nozzle in communication with one of said pair of inlet nozzles;

a second injection nozzle in communication with the other of said pair of inlet nozzles;

an inlet passage extending from each of said pair of inlet nozzles for transferring a molten material form a respective one of said first or second injection nozzles to said exit nozzle, said inlet passages meeting at a juncture such that said molten material flows through an exit passageway to said exit nozzle; and a valve pin for controlling the flow of fluid from each of said inlet passages to said exit nozzle;

said valve pin being rotatable between three positions, a first position allowing flow of molten material from a first of said pair of inlet nozzles to said exit nozzle and preventing flow of molten material from the second of said pair of inlet nozzles, a second position allowing flow of molten material from the second of said pair of inlet nozzles to said exit nozzle and preventing flow of molten material from the first of said pair of inlet nozzles, and a third position allowing flow of molten material from both of said pair of inlet nozzles to said exit nozzle.

2. The injection molding apparatus of claim 1, wherein said injection molding apparatus is a multi-injection unit injection molding machine.

3. A manifold for attachment to a multiple injection unit injection molding machine, comprising:
- a first inlet port in communication with one nozzle of said multiple injection unit injection molding machine;
- a second inlet port in communication with the other nozzle of said multiple injection unit injection molding machine;
- a first inlet passage having a first end in communication with said first inlet port and a second end opposite said first end;
- a second inlet passage having a first end in communication with said second inlet port and a second end opposite said first end;
- an exit port in communication with an exit nozzle;
- an exit passageway having a first end in communication with said exit port and a second ending communication with said second end of said first inlet passage and said second end of said second inlet passage;
- wherein said second end of said exit passageway, said second end of said first inlet passage and said second end of said second inlet passage meet at a juncture; and
- a valve pin for controlling the flow of a molten material from said first and second inlet passages to said exit passageway;
- said valve pin being rotatable between three positions, a first position allowing flow from said first inlet passage into said exit passageway and preventing flow from said second inlet passage, a second position allowing flow from said second inlet passage into said exit passageway and preventing flow from said first inlet passage, and a third position allowing flow from both said first and second inlet passages into said exit passageway.

4. The manifold of claim 3, wherein said manifold is mounted onto a false platen.

5. The manifold of claim 3, wherein said valve pin has a plurality of channels formed in its stem to direct the flow of said molten material.

6. An injection molding system comprising:
- a mold having an inlet and mold cavity formed therein in the shape of the part to be formed;
- a manifold having a pair of inlet nozzles and an exit nozzle, said exit nozzle in communication with said mold;
- a first injection barrel in communication with one of said pair of inlet nozzles for transferring a molten material thereto;
- a second injection barrel in communication with the other of said pair of inlet nozzles for transferring a molten material thereto;
- an inlet passage extending from each of said pair of inlet nozzles for transferring said received molten material, said inlet passages each having a first end in communication with a respective one of said pair of inlet nozzles and a second end that meet at a junction such that said molten material flows to said exit nozzle; and
- a valve pin for controlling the flow of fluid from each of said inlet passages to said exit nozzle;
- said valve pin being rotatable between three positions, a first position allowing flow from a first of said pair of inlet nozzles into said exit nozzle and preventing flow from a second of said pair of inlet nozzles, a second position allowing flow from said second said pair of inlet nozzles into said exit nozzle and preventing flow from said first of said pair of inlet nozzles, and a third position allowing flow from both said pair of inlet nozzles into said exit nozzle.

7. The injection molding system of claim 6 wherein said manifold is mounted onto a false platen which is mounted to said mold.

8. The injection molding system of claim 6 wherein said valve pin is manually adjustable to regulate the flow of molten material.

* * * * *